(No Model.)
R. LUNDELL.
REGULATOR FOR ELECTRIC GENERATORS AND MOTORS.
No. 437,704.　　　　　　　　Patented Oct. 7, 1890.
Fig. 1.
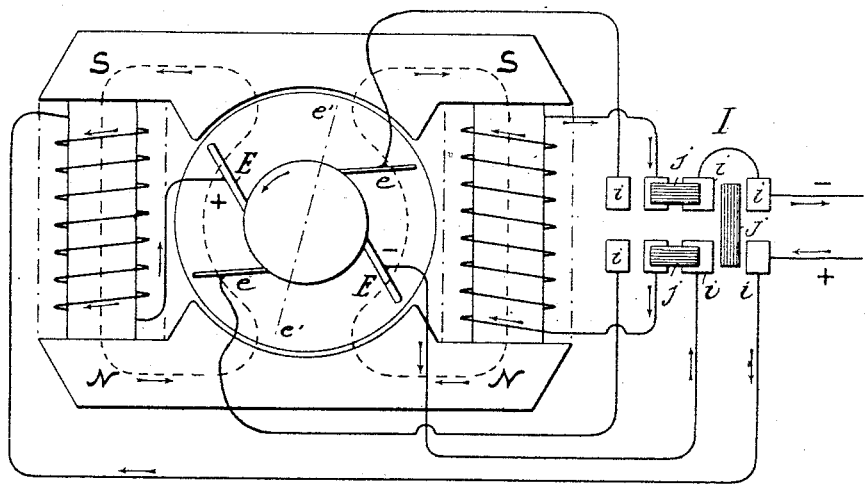
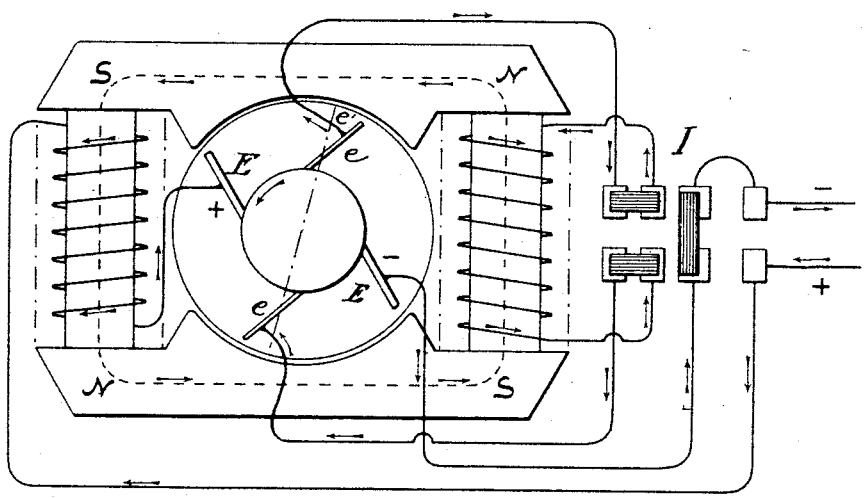
Fig. 2.
WITNESSES:　　　　　　　　　　INVENTOR
　　　　　　　　　　　　　　　　Robt Lundell
　　　　　　　　　　　　　　BY
　　　　　　　　　　　　　　　　ATTORNEY (No Model.) 5 Sheets—Sheet 4.

R. LUNDELL.
REGULATOR FOR ELECTRIC GENERATORS AND MOTORS.

No. 437,704. Patented Oct. 7, 1890.

WITNESSES:

INVENTOR
Robt Lundell
BY
ATTORNEY (No Model.) 5 Sheets—Sheet 5.
R. LUNDELL.
REGULATOR FOR ELECTRIC GENERATORS AND MOTORS.
No. 437,704. Patented Oct. 7, 1890.
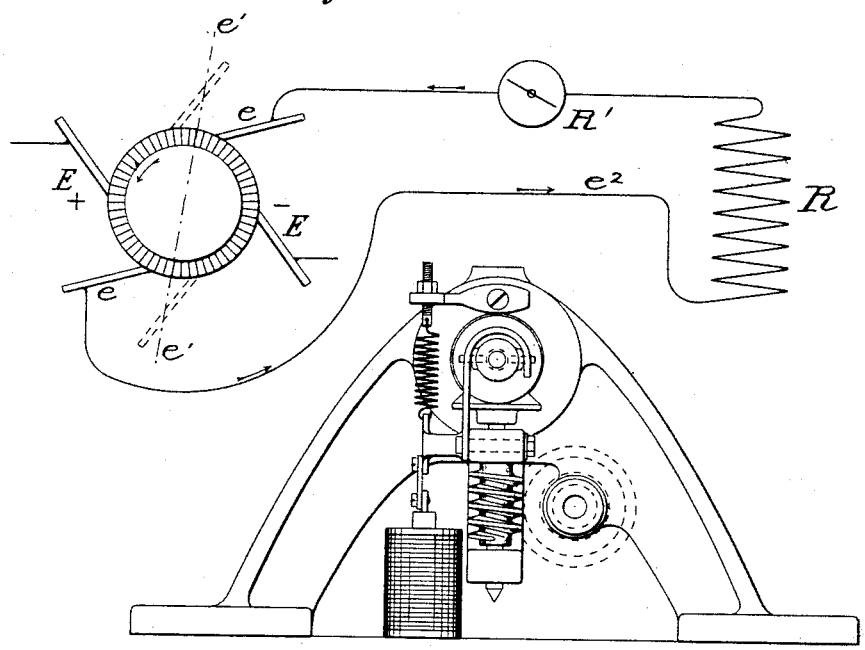
Fig. 11.
Fig. 9.
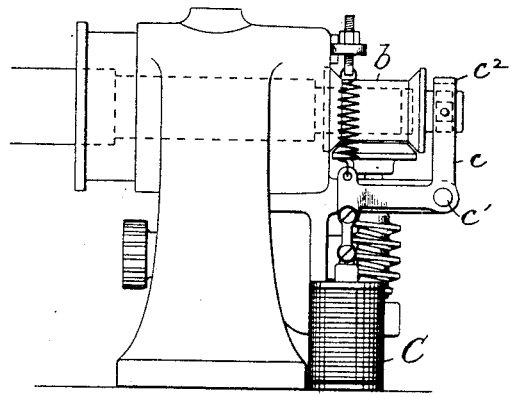
Fig. 10.
WITNESSES:
INVENTOR
Robt Lundell
BY
ATTORNEY

UNITED STATES PATENT OFFICE.

ROBERT LUNDELL, OF NEW YORK, N. Y.

REGULATOR FOR ELECTRIC GENERATORS AND MOTORS.

SPECIFICATION forming part of Letters Patent No. 437,704, dated October 7, 1890.

Application filed November 23, 1889. Serial No. 331,397. (No model.)

*To all whom it may concern:*

Be it known that I, ROBERT LUNDELL, a citizen of the United States, residing in New York city, in the county of New York and State of New York, have invented certain new and useful Improvements in Regulators for Electric Dynamos and Motors, of which the following is a specification.

The invention relates to the regulation of electric motors and generators. The regulation is accomplished by the use of two supplemental brushes which bear upon the commutator at diametrically-opposite points, and are shifted to a greater or less degree to either side of a plane cutting what is known as the "points of lowest potential." Following out the principle of the Wheatstone bridge, when these brushes are exactly upon the points of lowest potential there will be no current flowing in the circuit connecting the brushes; but if the brushes are shifted to one side or the other of these points a difference of potential will be established between the two brushes, and a current of greater or less degree will flow through the circuit connecting them. It is this current which I utilize to regulate the work of the machine, and I accomplish the same by winding the circuit carrying the current from the supplemental brushes around $a$, or the spool of the field-magnet. The automatic shifting of the brushes is accomplished by a novel form of centrifugal governor or through a solenoid-magnet in the main circuit, as the case may be.

Figure 3:
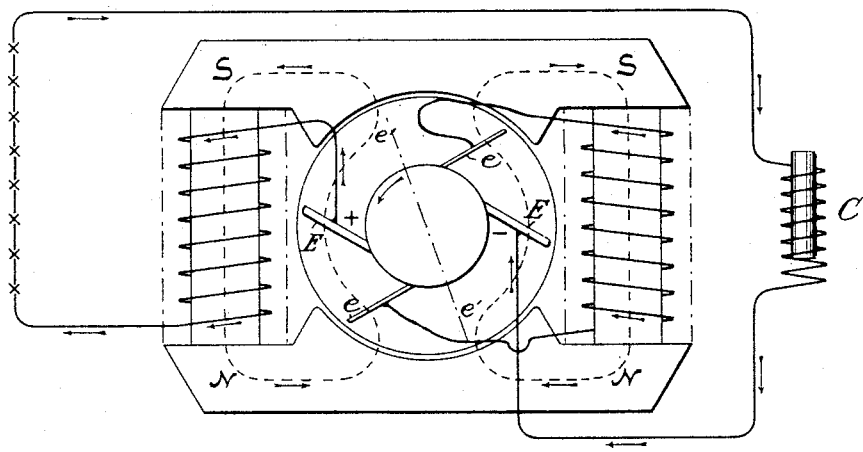
Figure 4:
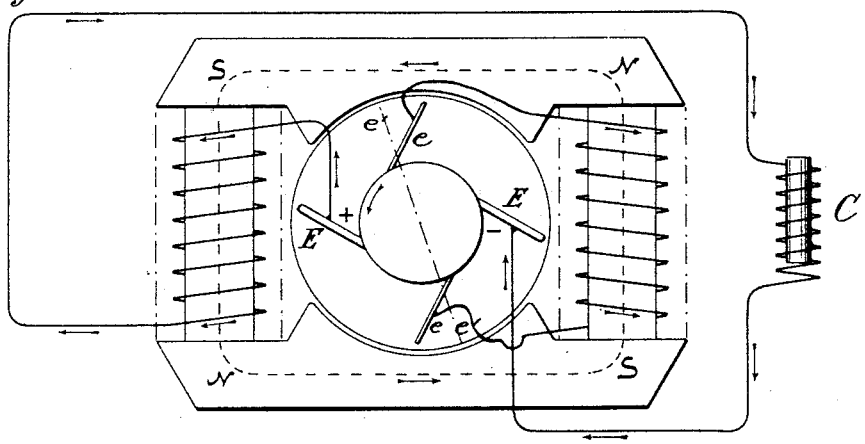
Figure 12:
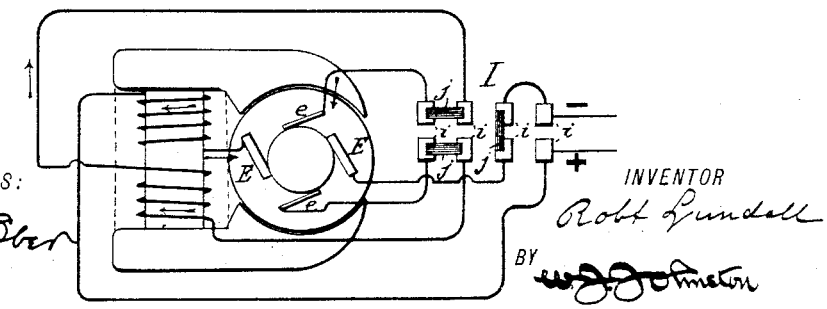
Figure 5:
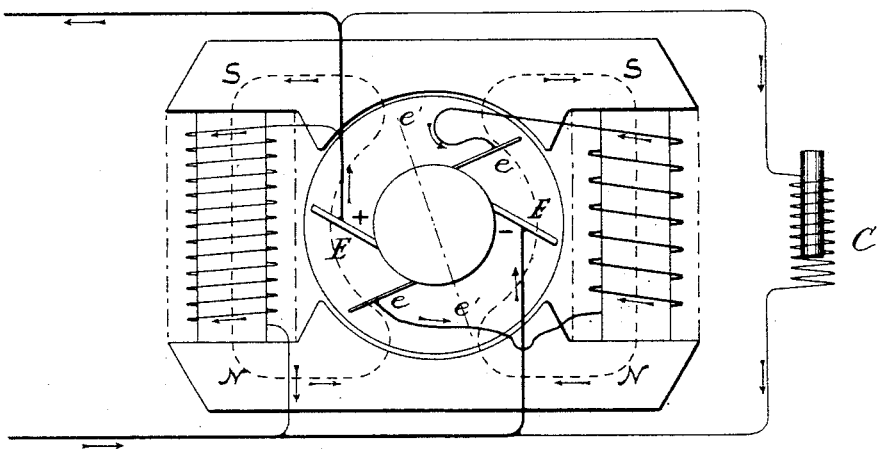
Figure 6:
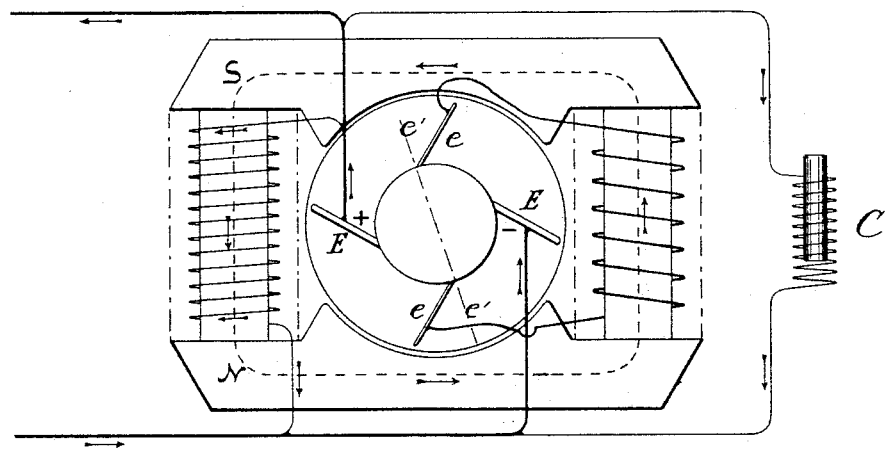
Figure 7:
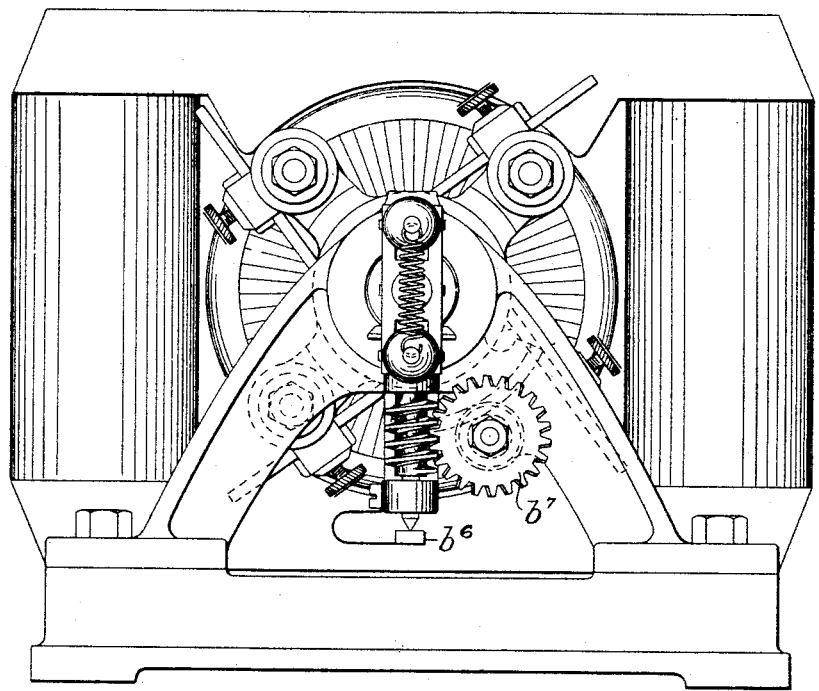
Figure 8:
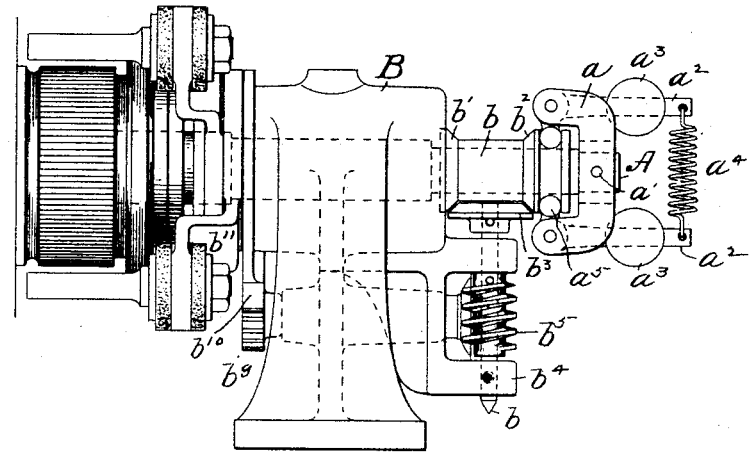

Referring to the accompanying drawings, Figures 1 and 2 are diagrams of the winding of a series motor. Figs. 3 and 4 are similar diagrams of a self-regulating constant-current dynamo. Figs. 5 and 6 represent a constant-potential dynamo. Figs. 7 and 8 are end and side elevations of a centrifugal device for shifting the auxiliary brushes on a motor. Figs. 9 and 10 show the mechanical arrangement through which a solenoid-magnet in the main circuit of a dynamo acts to shift the auxiliary brushes, and Fig. 11 is an explanatory diagram illustrating the principle upon which my invention is based. Fig. 12 is a diagram of a modified machine.

I will first describe the apparatus for shifting the auxiliary brushes, reference being taken to Figs. 7, 8, 9, and 10. A represents the main or armature shaft mounted in bearings B. The shaft extends outward beyond its bearing at one end and carries thereon a centrifugal governor. This apparatus consists of a yoke $a$, mounted normal to the shaft, and fixed thereon by a pin $a'$. Its outer ends are bent inward and are bifurcated to admit between them bell-crank levers $a^2$. One arm of each extends outward approximately parallel to the shaft and carries the weight or governor-ball $a^3$. Their extreme outer ends are connected together by a taut spiral spring $a^4$ of suitable strength. The other arms of the bell-crank extend inward at about right angles to the shaft and carry short cylindrical toes $a^5$. These toes rest in semi-cylindrical sockets formed between two flanges on the longitudinal sliding sleeve $b$. This sleeve carries two beveled-friction pinions $b'$ $b^2$, either of which is adapted to be brought into contact upon opposite sides with a horizontal beveled pinion $b^3$, supported upon the end of the vertical shaft $b^4$. This shaft has two bearings in the bracket $b^4$, and between these two bearings it carries a worm $b^5$, fixed thereto by a pin, as shown. The shaft is mounted loosely in its bearing and has a sliding vertical play, which is limited in the downward direction by the hub of wheel and in the upward direction by the worm, these two points impinging against the upper and lower sides, respectively, of one of the bearings of the shaft. The lower end of the shaft is pointed and stepped in the spring-mounted socket $b^6$. The vertical movement of the shaft is therefore modified by this spring. The worm rotates the gear $b^7$, mounted upon the horizontal shaft $b^8$, carrying on its opposite end a pinion $b^9$, engaging with gear-segment $b^{10}$, connected with the auxiliary brush-holder $b^{11}$. The sleeve $b$, the yoke $a$, the levers, governor-balls, and shaft A all rotate together. As the speed of the armature-shaft varies, the balls $a^3$ are thrown in or out, thus swinging the bell-cranks on their pivots and causing a sliding movement of the sleeve $b$ upon the shaft. This movement, if of sufficient amplitude, will bring either one or the other of the friction-gears $b'$ $b^2$ into contact with the gear $b^3$, thus rotating the worm-gear, the pinion $b^9$, segment $b^{10}$, and altering the position of the brushes upon the commutator.

Referring now to Figs. 9 and 10, I have shown this same arrangement of sliding sleeve carrying friction-gears, the worm, its gear, the pinion, and the brush-holder segment, all being the same as shown in Figs. 7 and 8. In this case, however, the centrifugal arrangement is done away with and the solenoid-magnet C substituted therefor. Its movable core is connected with a single bell-crank lever $c$, pivoted at $c'$ to a part of the frame and having a bent-over portion $c^2$, which engages on either side with the sleeve $b$. Any movement of the solenoid-core will cause a sliding of the sleeve $b^2$ and a shifting of the brushes, as above described.

To illustrate the principle upon which my regulator acts, I will refer to Fig. 11. Let us assume that this figure represents the commutator of a series or constant-current motor. The brushes E E are placed permanently at the two opposite points, the potentials of which are respectively the highest and lowest of the whole commutator. These points are commonly called the "neutral points." The other brushes $e\ e$ are adjustable from their position shown in full lines to the position shown in dotted lines, and the line $e'$ is perpendicular to the line connecting the two neutral points. Suppose the current from a constant-current dynamo enters at the brush marked and the armature is held stationary. The resistance of the motor will then be equal to the resistance of the wire only. The current will divide itself at E+ and flow according to the law of the Wheatstone bridge—that is, around both sides of the armature and out at E—. Suppose now that the brushes $e\ e$ are connected by a circuit $e^2$, including resistance R and galvanometer R', and that the said brushes rest upon the commutator at the points where the line $e'\ e'$ cuts it. Then no current will flow in the circuit $e^2$, because there is no difference of potential between these points; but if the brushes $e$ be shifted together to the opposite sides of the line $e'\ e'$, then currents will flow from the brush $e$ on the positive side through the resistance and back to the brush on the negative side. If now the armature be left free to revolve, the resistance and potential between the brushes E E will increase and reach its maximum at full speed and full load. There will then be a strong current flowing between the brushes $e\ e$. This current will be equal to the difference of potential between the brushes $e\ e$ divided by the resistance R, according to Ohm's law. If the brushes $e\ e$ be shifted toward the line $e'\ e'$, the current flowing through $e^2$ will decrease, and, finally, when the brushes have passed the line $e'\ e'$, will become reversed.

Referring now to Figs. 1 and 2, I have shown to the right a hand-switch I, having eight fixed contacts $i$ and three movable contacts $j$. In Fig. 1 the switch and circuits are shown in the condition of starting. The brushes $e\ e$ are cut out and the right-field coil is in series with the left-field coil and with the armature. This arrangement of circuits produces maximum torque at the starting movement. As soon as the armature has attained full speed the right-field coil is cut out of the main circuit by moving the switch I into position, as shown in Fig. 2. This new position of the switch, however, throws the brushes $e$ into circuit with the right field. If the motor is working under full load, the brushes $e\ e$ will remain at the points where they send a current through the field, which gives it the same polarity as that imparted to it by the constant field—that is to say, the whole upper pole-piece will be of N polarity and the lower pole-piece of S polarity, the lines of force traveling as indicated by the dotted lines in Fig. 1. If now the load is thrown off, the speed will increase; but when this takes place the centrifugal governor shown in Figs. 7 and 8 will move the brushes $e\ e$ forward until the magnetism of the right field is decreased and the speed becomes normal. When the armature is running idle, the brushes $e\ e$ will be forced beyond the line $e'\ e'$, thus reversing the magnetism of the right field and causing the lines of force to shunt the armature, as indicated by the dotted lines in Fig. 2.

Figs. 3 and 4 show the circuit and connections for a constant-current dynamo. It will be noticed that the connections are changed in order to obtain the same direction of rotation. When the dynamo is running at full load, as in Fig. 3, a small part of the armature is used to excite the right field to its full capacity. The magnetic lines are then forced through the armature. Let us suppose that some of the lamps are cut out, or that the resistance in the main circuit is decreased in some way. The current will then increase and the armature of the regulating-magnet C pull down. This throws the brush-shifting device shown in Figs. 9 and 10 into operation, and the brushes $e\ e$ will travel forward until the number of lines of force passing through the armature is decreased, thus cutting down the electro-motive force. When the current is reduced to the normal, the armature of the regulating-magnet goes back to its first position. If the dynamo is running on a short circuit, as shown in Fig. 4, the brushes $e\ e$ will reverse the current through the right-field coil, thus changing the polarity of one-half of the field and causing the lines of force to shunt the armature, as indicated by the dotted lines.

In Figs. 5 and 6 the diagrams of a constant-potential dynamo are given. The left-field coil as well as the regulating-magnet C are both in shunt circuits; but the right-field coil is excited from the supplemental brushes, as above described. Suppose a number of incandescent lamps are cut out of the circuit. The resistance between the terminals of the machine will become increased and a large amount of current will flow through the left-field coil, thus increasing the magnetizing force and the electro-motive force of the machine; but at the same time a larger current will flow through the regulating-magnet C, which shifts the brushes $e\ e$ forward in the manner above described until the electro-motive force is normal. When the machine is run upon an open circuit, as shown in Fig. 6, the brushes $e\ e$ are very close to the line $e'\ e'$, and the majority of the magnetic lines of force will shunt the armature, as indicated.

In the description so far given only those machines having two separate field-magnet cores have been mentioned; but in Fig. 12 a diagram is given showing the two circuits on a single core. The only difference in action between this arrangement and those already described is that when the current reverses in the regulating-circuit the magnetism produced in the core tends to neutralize the magnetism produced by the main coil, instead of shunting it.

Having thus described my invention, I claim—

A dynamo-electric machine embodying two separate field-magnets having common or consequent poles, an armature and commutator, in combination with a pair of main contact-brushes and a pair of supplemental contact-brushes, the supplemental brushes being located upon the commutator, respectively, at or near the points of lowest potential and adjustable to the opposite sides thereof, the said brushes also forming the terminals of a circuit including one only of said field-magnets, whereby the lines of force in the magnetic circuit may be caused to flow through the armature or shunt the same for the purpose of regulation.

In witness whereof I have hereunto signed my name in the presence of two subscribing witnesses.

ROBT. LUNDELL.

Witnesses:
WM. A. ROSENBAUM,
THOMAS K. TRENCHARD.